March 31, 1964  F. C. OWEN  3,127,580
CURRENT REGULATING WELDING TRANSFORMERS AND CORE THEREFOR
Filed April 25, 1963  3 Sheets-Sheet 1
FIG.1
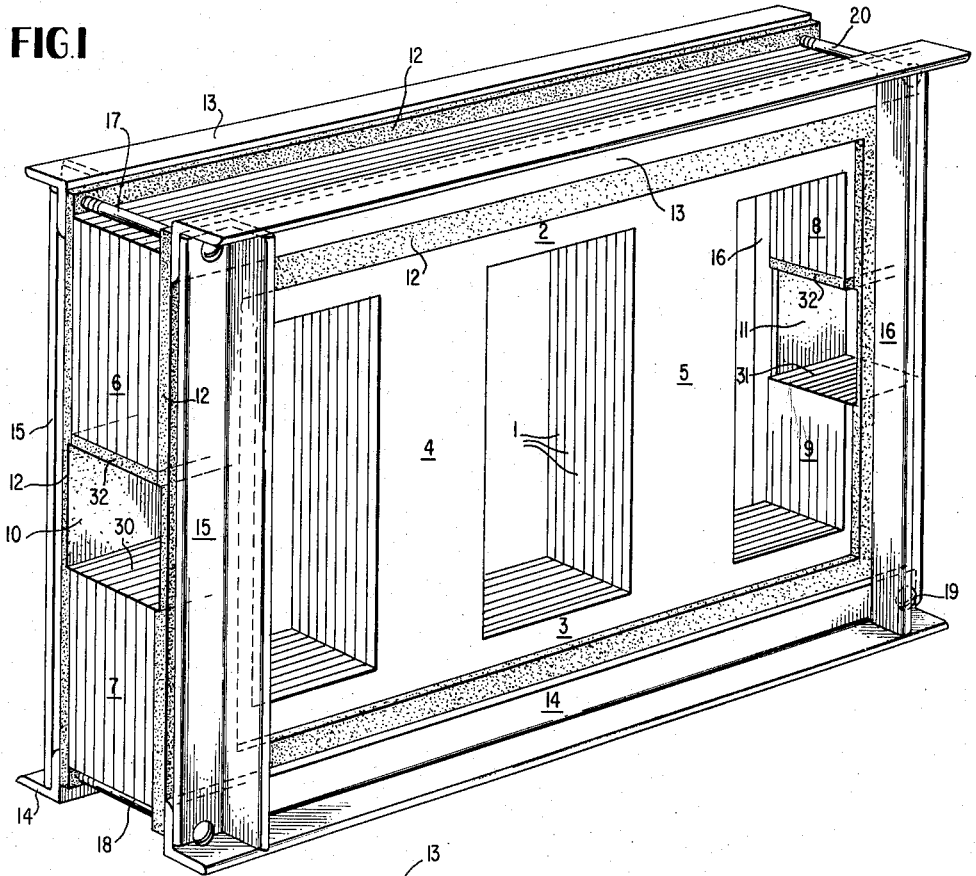
FIG.2
FIG.3
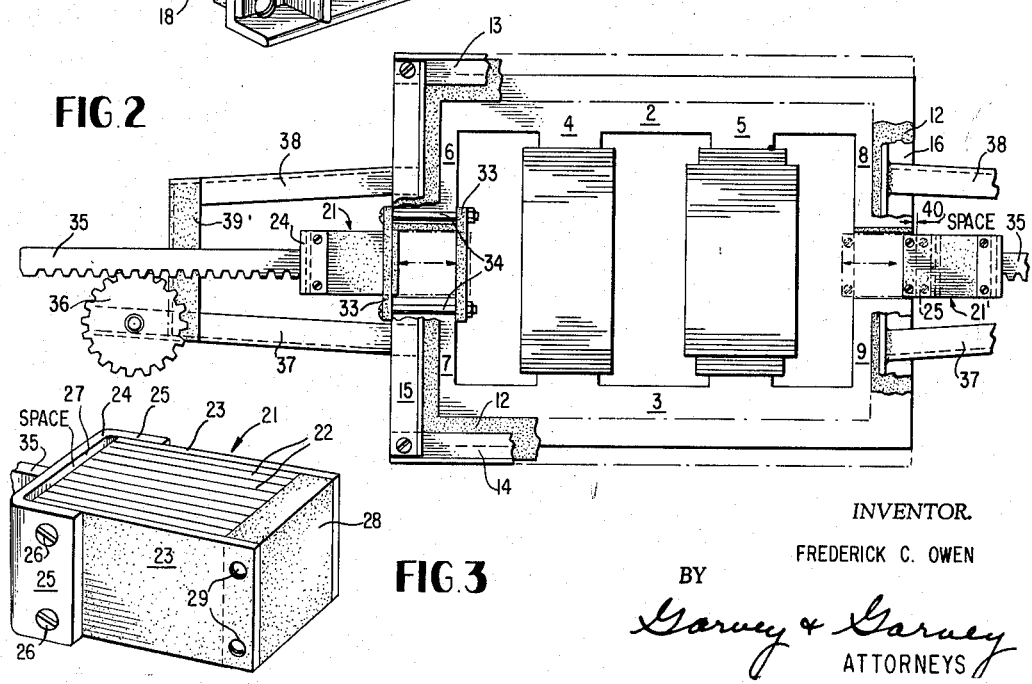
INVENTOR.
FREDERICK C. OWEN
BY
Garvey & Garvey
ATTORNEYS March 31, 1964  F. C. OWEN  3,127,580
CURRENT REGULATING WELDING TRANSFORMERS AND CORE THEREFOR
Filed April 25, 1963  3 Sheets-Sheet 2
FIG. 9
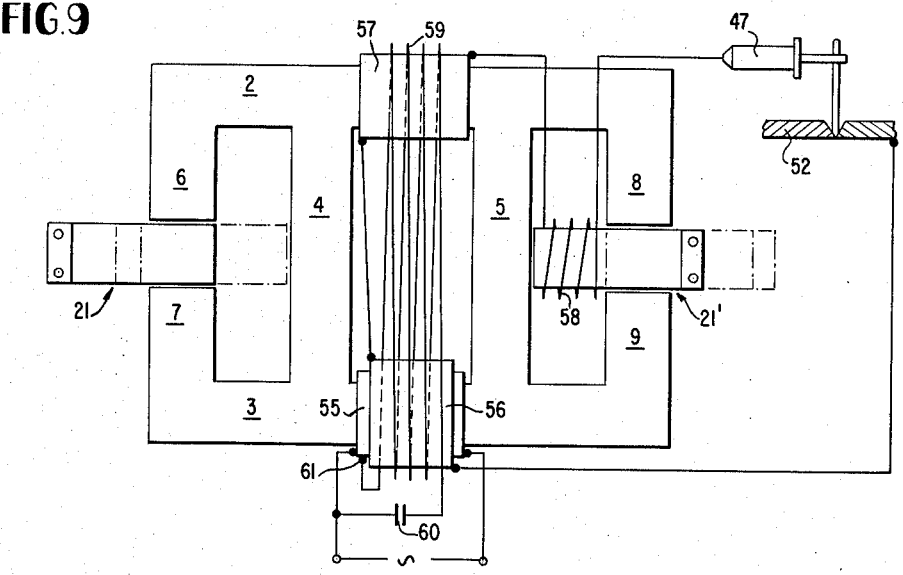
FIG. 8
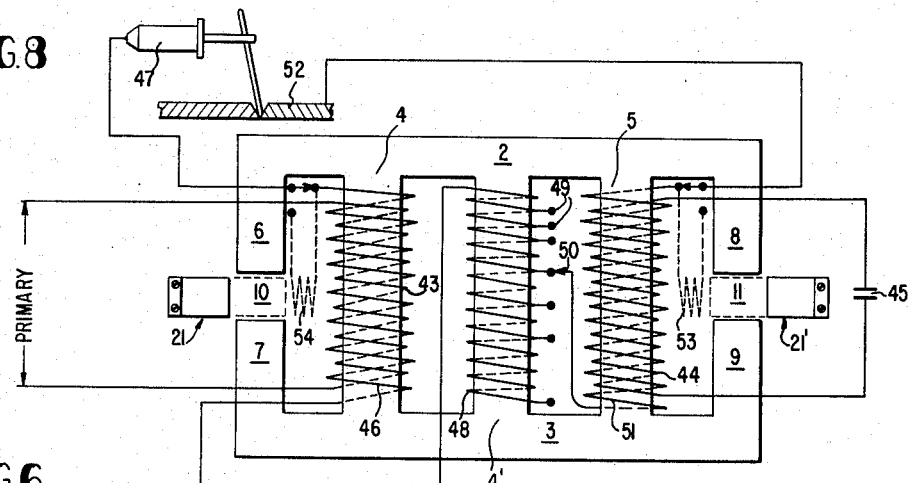
FIG. 6
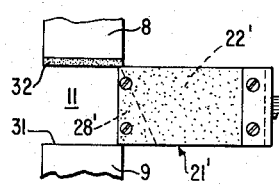
FIG. 5
FIG. 4
FIG. 7
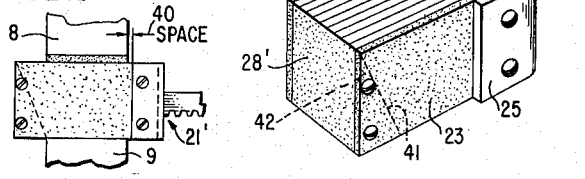
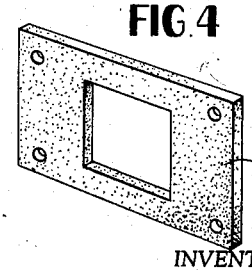
INVENTOR.
FREDERICK C. OWEN
BY
Garvey & Garvey
ATTORNEYS March 31, 1964     F. C. OWEN     3,127,580
CURRENT REGULATING WELDING TRANSFORMERS AND CORE THEREFOR
Filed April 25, 1963     3 Sheets-Sheet 3

INVENTOR.
FREDERICK C. OWEN
BY
*Garvey & Garvey*
ATTORNEYS

United States Patent Office 3,127,580
Patented Mar. 31, 1964

3,127,580
CURRENT REGULATING WELDING TRANS-
FORMERS AND CORE THEREFOR
Frederick C. Owen, 206 Fenton Place,
Charlotte 7, N.C.
Filed Apr. 25, 1963, Ser. No. 275,585
13 Claims. (Cl. 336—133)

This invention relates to welding transformers and more particularly to welding transformers having novel current regulating means.

One of the objects of the invention is to provide a construction of transformer core for welding transformers, and the like, which utilizes the leakage flux paths for controlling the secondary output current or welding current.

Another object of the invention is to provide a core construction for welding transformers which reduces the leakage flux in the transformer, thus enabling the transformer to be encased within a relatively small metal housing.

Another object of the invention is to provide several arrangements of efficient welding transformers having novel means for setting the transformer output current.

Another object of the invention is to provide a construction of welding transformer having a tuned circuit connected in the secondary circuit thereof and coupled with a movable portion of the core for setting the output welding current at a desired level.

Still another object of the invention is to provide a core construction for welding transformers with means for selectively setting the maximum desired current in the transformer secondary winding and means for varying the secondary welding current from the selected maximum to a desired minimum value.

A further object of the invention is to provide a construction of core for welding transformers and the like which utilizes the leakage flux at both ends of the transformer and provides means for effectively using this flux to improve transformer operating characteristics.

A still further object of the invention is to provide a construction of current regulating welding transformer core having selectively adjustable shunts at opposite ends thereof which are relatively quiet in operation.

Other and further objects of the invention reside in the construction of the adjustable shunts and the manner in which the adjustment of the shunts relative to each other provides an effective control of the transformer output current as set forth more fully in the specification hereinafter following by reference to the accompanying drawings, in which:

FIG. 1 is a perspective view of the transformer core according to the invention with the shunt members removed therefrom and shown on an enlarged scale;

FIG. 2 is a front elevational view with parts broken away showing the manner in which the adjustable shunt members are connected to the transformer core;

FIG. 3 is a perspective view of the preferred form of adjustable shunt on an enlarged scale;

FIG. 4 is a perspective view of one of the shunt support guide plates shown on an enlarged scale;

FIG. 5 is a perspective view of a modified form of the adjustable shunt member shown on an enlarged scale;

FIG. 6 is a simplified front elevational view showing the modified shunt of FIG. 5 in the withdrawn position from one of the transformer core air gaps and being shown on a reduced scale from FIG. 5;

FIG. 7 is a view similar to FIG. 6 but showing the modified magnetic shunt in the inserted position in the core air gap;

FIG. 8 is a schematic view showing one arrangement of welding transformer utilizing the novel core construction;

FIG. 9 is an electrical schematic view showing a preferred construction of welding transformer according to the teachings of the invention and showing a tuned circuit connected in secondary, used in combination with the novel core structure;

Figure 10:
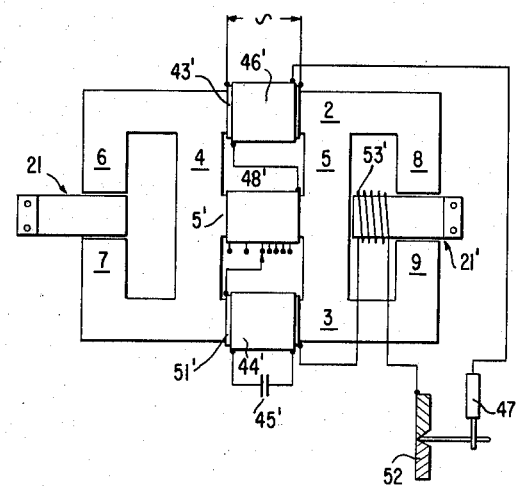
FIG. 10 is an electrical schematic diagram showing another modified form of welding transformer according to the invention.

Referring to the drawings in greater detail, the current regulating transformer core body portion of the invention shown in FIG. 1 comprises a plurality of stacked laminae 1 of paramagnetic material, such as iron, according to conventional transformer practice. The core body portion consists of the spaced top leg portion 2 and bottom leg portion 3 interconnected intermediate the ends thereof by intermediate leg portions 4 and 5, with corresponding ends of top and bottom leg portions 2 and 3 terminating in pairs of end leg portions 6–7 and 8–9, respectively, separated by the air gaps indicated at 10 and 11.

The generally rectangular insulation members 12 are positioned on opposite faces of the core body portion so as to overlie the top and bottom leg portions 2 and 3 and the pairs of end leg portions 6–7 and 8–9, and extending over the sides of the respective air gaps 10 and 11 as shown. A pair of top angle members 13 and bottom angle members 14 are disposed with one flange thereof in overlying contact with the top and bottom edge portions of the insulation members 12 and extending longitudinally of the core body portion and positioned such that the flanges extend somewhat outwardly of the top and bottom edge extremities of the top leg portion 2 and bottom leg portion 3, respectively. The other flanges of the angle members 13 and 14 are disposed to extend outwardly of the core body portion at substantially right angles to the face thereof. Corresponding pairs of angle clamps 15 and 16 are positioned intermediate the corresponding ends of the pairs of longitudinally extending angle members or clamps 13–14 in positions overlying the flange members which are disposed in contact with the insulation members 12. The entire core assembly is then secured together as a unit by insulated bolts 17, 18, 19 and 20 extending transversely of the core and respectively extending through the overlying cooperating flanges of angle clamps 13, 15; 14, 15; 14, 16 and 13, 16, respectively, on opposite sides of the transformer core body portion to securely clamp the laminae 1 together as a unit. The angle clamps 13, 14, 15 and 16 thus form frame members on opposite sides of the core body portion which are disposed in clamping engagement with each other to unitize the transformer core structure. Since the angle clamps or members 13 and 14 extend over the top and bottom edges of leg portions 2 and 3, the insulated bolts 17, 20 and 18, 19 which provide the clamping force respectively extend above and beneath said leg portions.

A shunt member indicated generally at 21 is provided for insertion in the air gaps 10 and 11. Each shunt member consists of a plurality of substantially rectangular laminae 22 equal in number to the laminae 1 forming the core body portion, formed of the same material, and extending in the same plane. The plurality of shunt laminae 22 are flanked by plates 23 of insulation material, and the plates are clamped together by U-shaped clamp member 24, extending transversely of the ends of the laminae 22 with clamp member opposite side portions 25 straddling the insulation plates 23 with the plates 23 and laminae 22 secured thereto by means of insulated bolts 26 extending therethrough. The transverse portion of shunt clamp member 24 is spaced away from the terminating ends of laminae 22 as indicated at 27 so that the laminae are not shortcircuited with each other when clamp member 24 is constructed of electrically conductive material. Shunt guide block 28 constructed of insulation material is positioned transversely in abutment with the opposite ends of shunt laminae 22 and is secured intermediate the side insulation plates 23 by bolts 29. The air gaps 10 and 11 of the core body portion are each designed for receiving a shunt member 21, wherein for purposes of clearer explanation the shunt associated with air gap 10 is indicated at 21 in FIG. 2 and the shunt associated with air gap 11 is designated at 21'. When the magnetic shunts are inserted in the air gaps the insulation plates 23 are disposed in sliding engagement with insulation members 12 and the bottom edges of laminae 22 are disposed in sliding engagement with the terminating surfaces 30 and 31 respectively of end leg portions 7 and 9. To accommodate the thickness of insulation plates 23 of the shunts it may be necessary to provide recessed channels in insulation members 12 in the area of the air gaps as shown in FIG. 1. Sheets of insulation material 32 are provided on the terminating ends of core end leg portions 6 and 8 to maintain an effective air gap between the terminating ends of these end leg portions and the top edges of the magnetic shunt laminae 22 which are disposed in sliding engagement with insulation sheets 32. It is to be understood however that use of the insulation sheets 32 is optional but they are normally used between one of the end leg portions and the magnetic shunt on each end of the current regulating core in order to reduce the noise of shunt chatter. A higher current in the secondary will be produced when the shunt or shunts are entirely out of the magnetic circuit. The provision of an air gap between one surface of the shunt and the terminating end of one end leg portion effectively reduces chatter noise normally produced by the magnetic shunt 21 when the transformer is energized. In addition to reducing shunt chatter the insulation sheets 32 also maintain an effective air gap which breaks the flux path in the core, and the wider the gap is the higher is the secondary current and turns would have to be added to the reactance coils to compensate for the thickness of any insulation used in the manner. It has been known in the prior art to provide an adjustable shunt in one end of a transformer core, but these core constructions did not effectively provide for elimination of high magnetic leakage and use of the magnetic leakage flux for control of the secondary output current. This feature can only be obtained on high leakage flux type transformers when the core is extended on both ends and an adjustable shunt is provided in the end extension as set forth in the present disclosure. The core will operate as described with only one shunt and the other end core extension closed or provided with a fixed air gap, but greater control of the secondary current is provided by utilizing two shunt members as shown. It has been found in practice that the air gaps at 32 also tend to make the welding arc smoother in performance.

A pair of shunt support guide plates 33, preferably constructed of insulation materials, such as Bakelite, with each having an opening therein of substantially the same size as the cross-section of air gaps 10 and 11 and shunt members 21 and 21', are connected by means of insulated bolts 34 on either end of air gaps 10 and 11, and extending transversely of core laminae 1 such that the openings therein are disposed in registration with the air gap openings on either end and are adapted to receive and guide the shunt members 21 and 21' into and out of air gaps 10 and 11, respectively. In FIG. 2 the shunt support guide plates 33 have been eliminated from the right side of the figure for purposes of simplicity, but it is to be understood that these support guide plates are clamped about the core in registration with the air gaps in opposite ends of the core.

The movable shunt members 21 and 21' may be adjusted in and out of their respective air gaps by a rack and pinion mechanism, as shown in FIG. 2. Rack gear 35, securely connected to shunt clamp member 24, is disposed in meshing engagement with gear 36 pivotally connected to a support assembly consisting of members 37 and 38 secured to the core end angle clamps 15 or 16, by welding or the like, connected by cross members 39. Rack 35, gear 36 and cross member 39 are preferably constructed of insulation material, such as Bakelite or nylon, so as to prevent eddy currents in the metal support members which would result in hysteresis losses. Knobs, handles, cranks, or other suitable means, can be connected with gears 36 for rotating the same to selectively adjust the shunts 21 and 21' in and out of the air gaps 10 and 11, respectively.

The shunts may be selectively adjusted by control means other than that disclosed herein, such as by a screw and crank arrangement of the type disclosed in my copending application Serial No. 180,257, filed March 16, 1962, now Patent No. 3,091,744, May 28, 1963 for "Transformer with Magnetic Leakage Shield." When the shunts are adjusted to their withdrawn positions, as indicated in full lines, in FIG. 2, the shunt laminae 22 are completely removed from the air gap area between the terminating ends of core leg portions 6–7 and 8–9, and in this position the shunt guide blocks 28 remain in guiding contact with the apertures in the outermost shunt support guide plates 33. When the adjustable shunt members 21 and 21' are adjusted to their inserted positions, as indicated in dotted lines on the right hand portion of FIG. 2, the edges of shunt laminae 22 are disposed in vertical registration with the corresponding laminae of the end leg portions. If insulation sheets 32 are not used in a particular application and the upper and lower edges of the shunt are disposed in sliding contact with the terminating ends of the end leg portions forming the air gap, then, in effect, when the shunts are completely inserted, the end legs of the core perform as though they were solid members without air gaps.

As indicated at 40, in FIG. 2, the shunt members are constructed of such a length that a spacing is left between the side portions 25 of shunt clamp members 24 and the perimeter of the end angle clamps 15 and 16 when the shunts are in the inserted positions so that there will be no shortcircuiting of the core when shunt clamps 24 are constructed of electrically conductive material.

A modified form of the adjustable shunts 21 and 21' is shown in FIGS. 5, 6 and 7 wherein, for purposes of continuity, primed numbers, corresponding to the reference numerals in the preferred form of the shunt shown in FIG. 3, have been used to designate similar modified elements. In this form of the invention the ends of the shunt laminae 22' are cut on a bias as indicated at 41 and the shunt guide insulation block 28' is of triangular vertical section, rather than rectangular as in the preferred form of the invention, to correspond with the terminating edge 41 of laminae 22'. In this form of the shunt the apex 42 of insulation block 28' is normally slightly less than 30 degrees although this is not a limiting factor. In FIG. 6 the modified shunt 21' is shown in the withdrawn position from which it can be noted that the top edges of shunt laminae 22' remain in sliding contact with air gap insulation sheet 32 while shunt insulation block 28' forms an air gap between the lower edges of laminae 22' and the surface 31 of end leg portion 9 to thus effect complete removal of the shunt from the core magnetic circuit. In FIG. 7 the modified shunt is shown fully inserted between the end leg portions 8 and 9 of the core.

Both the preferred and modified forms of the shunt have been shown with shunt laminae 22, 22' just long enough for fully completing the magnetic circuit between the end leg portions of the core. This is also indicated in the welding transformer of FIG. 8, but it is to be understood, as shown in the welding transformers of FIGS. 9, 10 and 11, that the shunts can be constructed of greater length to complete additional magnetic circuits with other leg portions in the core.

One form of welding transformer constructed according to the teachings of the invention has been shown in FIG. 8, wound on a core similar to that disclosed in FIGS. 1 and 2, but for this particular transformer arrangement showing an additional core center leg portion 4'. The arrangement of transformer windings is a simplified version of the transformer shown and disclosed in my Patent No. 2,365,722, issued December 26, 1944, which is incorporated herein by reference for a further explanation of the operation of the transformer. In the transformer shown, primary winding 43 is wound on intermediate leg portion 4, and condenser winding 44 for charging the condenser bank 45 is wound on intermediate leg portion 5. The transformer secondary circuit consists of secondary winding 46 wound on leg portion 4 with primary winding 43, with one end thereof connected to the electrode-holder 47, and the opposite end thereof connected in series with winding 48 wound on the center intermediate leg portion 4'. Winding 48 is provided with a plurality of welding current voltage regulation taps 49 selectively engageable by movable tap 50 carried by one end of secondary winding 51 which is wound on intermediate leg portion 5 with condenser winding 44. The opposite end of winding 51 is connected to the work 52 to complete the series secondary circuit from electrode-holder 47 to work 52 through secondary windings 46, 48 and 51. Immediately upon striking of the arc condensers 45 charge to their maximum value, thus enabling the welding transformer to operate as efficiently as a welding transformer having much greater open circuit voltages and yet, at the same time, giving the advantage of a much lower open circuit voltage machine.

Adjustable shunt 21 in one end of the core may be selectively adjusted in the air gap 10 to limit the maximum permissible output current in the secondary circuit. Adjustable shunt 21' in the opposite end of the core can then be adjusted in and out of the air gap 11 to vary the secondary current from the permissible maximum set by shunt 21 to a desired minimum welding current. The high secondary current is obtained when shunts 21 and 21' are completely extracted from their air gaps as shown in full lines in FIG. 8. By then adjusting one of the shunts, such as 21', into its air gap, the secondary welding current can be adjusted from the maximum current down to a desired minimum. Thus the further the shunts are extracted from the core, the heavier is the current flow in the secondary and the larger is the charge on the condensers 45 connected to the condenser windings. Conversely, the further the shunts are inserted into the air gaps the lower the charge on the condensers and the lower is the current flow in the secondary circuit. In the transformer, as shown, as in the transformers of FIGS. 9, 10 and 11, either shunt can be used for adjusting the maximum permissible output current, and then of course the opposite shunt is used for varying the output current from the set permissible maximum to a desired minimum. Thus, their operation is interchangeable.

By extending the core on either end with the pairs of end leg portions 6–7 and 8–9 the benefits of the transformer end leakage fluxes can be utilized for transformer output current regulation and at the same time the leakage flux of the transformer is reduced to enable the transformer to be encased within a metal box or the like without shortcircuiting of the same.

The core arrangement apparently enables the benefits of the leakage flux field to be selectively varied, that is, the coupling of the magnetic leakage flux path back to the perimeter winding as well as the secondary and condenser windings can be selectively varied by operation of the shunts 21 and 21' to give a better performing A.C. welding transformer than has heretofore been provided in the art. The harnessed leakage flux under control of the magnetic shunt thus tends to hold up the primary voltage to eliminate variations from the same and tends to increase the secondary voltage upon the striking of the arc, since more lines of flux are interlinked with the windings in the secondary circuit and the condenser winding, giving a steady straight arc which is easily controllable and which is not subject to arc blow.

It has been found that greater control of the secondary current can be obtained by adding a stationary shunt coil 53, as shown in dotted lines in FIG. 8, connected in series with the secondary circuit, such as between the output of secondary winding 51 and the work 52. Coil 53 is arranged in the path of movement of shunt 21' and when this coil is used, an elongated shunt is utilized so that it can extend completely through the center of the coil in the inserted position. This coil 53, used in connection with its associated shunt, in effect is a tuned circuit connected in series with the secondary output circuit and enables even more current to be generated into the secondary circuit when the arc is struck and gives greater selective regulation of the secondary current. The theory of operation is not completely understood since the magnetic leakage flux of the transformer is shunted by the shunt members back into the main portion of the core to interlink the various transformer windings. Additionally, coil 53, positioned within the perimeter of the core, is cut by various flux paths within the core when the arc is struck thus adding to the secondary welding current obtainable from the machine. In like manner, if desired, a similar shunt coil 54 can be connected in series between secondary winding 46 and electrode-holder 47 as shown in dotted lines, positioned interior of the core and in the path of travel of shunt 21, with this shunt being elongated so that it can extend completely within and be withdrawn from the center of coil 54, as the same is selectively adjusted.

A preferred arrangement of welding transformer constructed according to the teachings of the invention has been shown in FIG. 9, utilizing the core structure, as shown in FIGS. 1 and 2, with the shunts 21 and 21' being of the elongated type as previously mentioned. The transformer circuit comprises primary winding 55 wound on leg portion 3 between intermediate leg portions 4 and 5 with main secondary winding 56 wound concentrically therewith with one end connected to work 52 and the opposite end connected in series with auxiliary secondary winding 57 wound on leg portion 2 between intermediate leg portions 4 and 5. The opposite end of auxiliary secondary winding 57 is connected to electrode-holder 47 through the series shunt coil 58 which is positioned interior of the perimeter of the core and in a position so as to surround shunt 21' when the latter is completely inserted, as shown in full lines. Main secondary winding 56 is approximately 90° out of phase with primary winding 55 and auxiliary secondary winding 57 is approximately 180° out of phase with primary winding 55 and approximately 90° out of phase with secondary winding 56. If desired, an additional shunt winding similar to winding 58 can be provided on the opposite end of the core connected in series with the secondary circuit for operation with shunt 21.

A winding 59 is provided about the perimeter of the transformer on top of the previously mentioned primary and secondary windings, as shown, connected in additive relation to primary winding 55 with one end thereof connected to the opposite end of the primary through condenser bank 60 and the other end connected to a tap 61 on the primary, a few turns removed from the end connected with condenser 60. In this form of the welding transformer the condenser bank 60 is charged with a small charge, at all times, from the few turns of primary winding 55 across which it is connected and its inductive linkage with the remainder of the primary winding. The instant the secondary circuit is closed, that is, the instant the arc is struck, the condenser bank 60 becomes fully charged due to the inductive coupling of perimeter winding 59 with the secondary windings 56 and 57. With the condenser bank 60 connected into the primary circuit in this manner, when it becomes charged it tends to decrease the ampere draw from the line and stabilize secondary voltage to eliminate variations in the welding arc due to secondary voltage variations. Additionally, this arrangement has been found to improve the power factor of the machine appreciably. It is to be understood that winding 59 may be connected in opposition to primary winding 55, if so desired, to reduce the voltage generated in the perimeter winding by the few volts generated in the few primary turns.

The shunt coil 58 is disposed as shown so that shunt 21' can move in and out of the center thereof, as a tuning slug and, in effect, this arrangement constitutes a tuned circuit connected in series with the secondary output circuit. The shunts in this form of the invention can eliminate the insulation block on the end thereof so that the laminae of the shunt can actually contact the side surfaces of intermediate leg portions 4 and 5. With this arrangement, greater current regulation and variation is obtainable since the shunt can be adjusted all the way into contact with the intermediate leg portions 4 and 5. In the form of the invention shown in FIG. 8, this is not possible since windings are disposed about the intermediate legs 4 and 5 which limits the travel of the shunts and prevents them from being adjusted into contacting relation with the leg portions 4 and 5.

The shunt 21' acting in conjunction with the shunt inductor coil 58 gives absolute control and regulation of the secondary current; for example, if the main secondary and auxiliary windings 56 and 57 produce 1500 amperes, this current is too high for performing welding operations. By putting the shunt coil 58 in series with the secondary circuit in the manner shown, the secondary current can be reduced to a usable level, for example, such as 600 amperes, and by adjusting shunt 21' inwardly into the air gap and into the center of coil 58 the secondary current can be varied from the 600 ampere level to near zero. Shunt 21 at the opposite end of the core also enters into the setting of the maximum permissible current in the secondary. As before, the maximum current is obtainable when the shunt is completely removed from the air gap, and in the position shown in FIG. 9 it would be the same as having a solid core joining the leg portions 6 and 7 if an insulation sheet air gap 32 was not provided. This would build into the machine the maximum current output obtainable therefrom but of course the opposite shunt 21' would still vary the current from that set maximum to near zero. If the shunt was not used, the core extension, including leg portions 6 and 7, is still necessary for confining and eliminating leakage flux from the transformer. When the shunt 21 is utilized a second shunt coil similar to coil 58 can be placed about the shunt, in similar manner, connected in series with the secondary circuit. Thus in this transformer arrangement it can be seen that the maximum current output of the machine is regulated by shunt 21 and shunt coil 58, and current regulation from the set maximum to near zero is obtainable with manipulation of the shunt 21'.

A further welding transformer constructed according to the teachings of the invention has been shown in FIG. 10 in which the arrangement of transformer windings is the same as that shown in FIG. 8, with corresponding windings being indicated by prime numerals. However, the windings are wound about the longitudinal leg portions rather than the vertical leg portions as shown in FIG. 8. The transformer operation is basically the same as that of the transformer of FIG. 8 but more current variation control is obtainable and a lower secondary current can be obtained through adjustment of the shunts since the shunts can be directed into close proximity or contact with the intermediate leg portions 4 and 5 since there are no windings disposed thereabout. Primary winding 43' is wound about upper leg portion 2 intermediate the leg portions 4 and 5 with secondary winding 46' wound concentrically therewith. Winding 48' is wound about horizontal leg portion 5' which extends between leg portions 4 and 5 at a position substantially midway between top and bottom leg portions 2 and 3. Condenser winding 44', having condenser bank 45' connected thereacross, is wound on leg portion 3 concentrically with secondary winding 51' and the secondary windings 46', 48' and 51' are connected in series with electrode-holder 47, work 52, and shunt winding 53' to form the transformer secondary circuit. As in the form of the invention shown in FIG. 9, shunt 21 could be eliminated or an additional shunt winding, such as 53', could be used in conjunction therewith, connected in series with the secondary circuit with this shunt, together with the shunt windings being utilized to set the maximum permissible output current. Shunt 21' is then used to vary the welding current to a desired level between that set maximum and near zero by progressively advancing the shunt into the air gap between leg portions 8 and 9 and through the center of shunt coil 53' and ultimately for minimum current into contact with intermediate leg portion 5.

Figure 11:
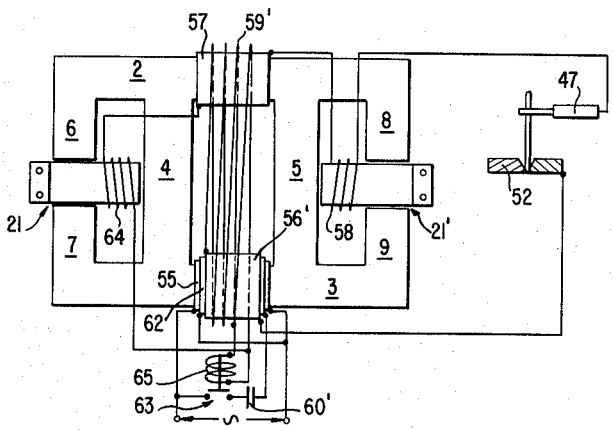
FIG. 11 is a schematic diagram showing a modified form of the transformer of FIG. 9.
Figure 12:
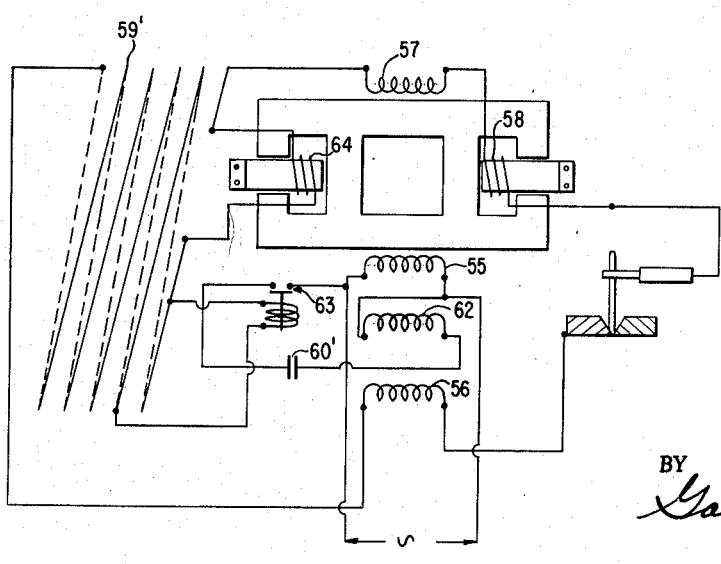
FIG. 12 is an electrical schematic diagram of the transformer of FIG. 11.

A modified and more sophisticated form of the welding transformer of FIG. 9 is shown in FIG. 11, wherein similar reference characters designate similar components.

Primary winding 55 is wound on leg portion 3 with condenser winding 62 wound concentrically therewith and connected as an auto transformer with the primary winding. A bank of condensers, indicated at 60', is connected in series with condenser winding 62 together with a switch indicated generally at 63 for closing the circuit. Main secondary winding 56 is wound on the transformer with the condenser and primary windings with one end connected to work 52 and the other end thereof connected to winding 59' wound about the perimeter of the transformer with its opposite end connected to auxiliary winding 57 through the series connected shunt inductor coil 64. The output end of auxiliary secondary winding 57 is connected to electrode-holder 47 through the series shunt inductor coil 58 in the same manner as in FIG. 9, to complete the secondary welding circuit.

Switch 63 is preferably of the solenoid type with its energizing coil 65 connected in parallel with the last turn or last few turns of perimeter winding 59', as shown, such that coil 65 is energized and switch 63 is closed to complete the condenser circuit to charge the same instantaneously upon striking the welding arc. In the welding transformer shown the perimeter winding 59' is part of the secondary circuit and the condensers 60' are connected in parallel with the primary winding. With the condensers in parallel with the primary winding and the condenser winding wound with the primary winding rather than around the perimeter of the transformer, as in the form of the invention shown in FIG. 9, more power factor correcting capacity and better output current performance is obtained. As in the other forms of the invention, the condensers make the arc easy to strike and to maintain, but with this arrangement the instant the arc is broken, switch 63 is deenergized to disconnect the condensers from the primary circuit. The condensers connected in this manner also decrease voltage variations in the primary winding which have the effect of decreasing voltage variations in the secondary circuit, thus improving the stability of the arc.

The maximum permissible output current of the machine is set by adjusting either shunt 21 or 21' and then the welding current can be regulated to a desired value by adjusting the opposite shunt from the completely withdrawn position toward the completely inserted position, in FIG. 11. With the shunts shown in the position indicated in FIG. 11, the minimum welding current output is obtained from the machine.

The open circuit voltage of all the welding transformers shown are not much in excess of the arc voltage, that is, the voltage across the arc when the transformer is under load. For instance, with an open circuit voltage of approximately 38 volts, arc voltage of from 25–30 volts is obtained. With an open circuit voltage of approximately 60 volts an arc voltage of from approximately 35–45 volts is obtained. This is one of the many advantages of the welding transformers disclosed herein and the manufacturing cost has been found to be considerably less than that of conventional types A.C. welding transformers, because the welder is self-contained. Best results are of course obtained when both adjustable shunts are used in the extended leakage flux confining core structure. In each of the arrangements shown the condensers charge only when an arc is struck and the welding voltage is a compound voltage accumulated from the inductive coupling of all the transformer windings on the core. This compound voltage gives a welding characteristic somewhat like a D.C. arc, even though it is an A.C. arc, but the disadvantage of arc blow is eliminated and a steady arc which is easily maintainable, and which can be used for overhead as well as other types of welding, is produced.

While I have described the invention in certain preferred embodiments it is realized that modifications can be made and it is to be understood that no limitations upon the invention are intended other than may be imposed by the scope of the appended claims.

What I claim as new and desire to secure by Letters Patent of the United States, is as follows:

1. A welding transformer comprising, a core having a pair of air gaps at opposite points therein, a pair of shunt core sections positioned in said gaps and manually slidable therein for selectively bridging and opening said gaps independently, at least a pair of core leg sections connecting opposite portions of said core intermediate said air gaps and disposed in spaced relation and normal to the plane of movement of said shunt core sections, primary and secondary windings positioned on the core intermediate said pair of air gaps to produce a secondary output current, one of said shunt core sections being manually movable toward and away from one of said core leg sections to set the maximum permissible output current from said secondary and the other shunt core section being manually movable toward and away from the other core leg section to adjust the secondary output current from the set permissible maximum to a minimum.

2. A welding transformer as set forth in claim 1 in which said pair of shunt core sections have inner terminating ends disposed at acute angles to said core leg sections.

3. A welding transformer as set forth in claim 1 in which each of said shunt core sections have top and bottom surfaces with one of said surfaces being of greater length than the other.

4. A welding transformer comprising a core with a pair of gaps at opposite points therein, a pair of shunt core sections slidably positioned in said gaps and movable therein for selectively bridging and opening said gaps independently, transverse core means connecting opposite portions of said core intermediate said air gaps, primary and secondary windings producing an output current positioned on said transverse core means and intersecting the plane of movement of said shunt core sections at substantially right angles, one of said shunt core sections being movable to select the maximum permissible output current from the secondary winding and the other of said shunt core sections being movable to adjust the output current from the selected maximum to a minimum.

5. A welding transformer comprising a core with a pair of gaps at opposite points therein, a pair of shunt core sections positioned in said gaps and slidable therein for selectively bridging and opening said gaps independently, a pair of core leg sections connecting opposite portions of said core intermediate said air gaps and disposed in spaced relation and normal to the plane of movement of said shunt core sections, primary and secondary windings producing an output welding current positioned on said core intermediate said spaced pair of core leg sections, one of said shunt core sections being movable toward and away from one of said core leg sections to a selected position to set the maximum permissible output current from said secondary, and the other of said shunt core sections being movable toward and away from the other core leg section to vary the secondary output current from the set permissible maximum to a minimum.

6. A welding transformer as set forth in claim 5 in which said pair of shunt core sections are elongated and are manually movable into contacting relation with said core leg sections to vary the output current.

7. A welding transformer as set forth in claim 5 including, at least one inductance winding connected in series circuit with said secondary winding and positioned intermediate one of said gaps and said core leg sections and disposed in surrounding relation to the plane of movement of said shunt core section connected in said gap for providing finer adjustment of the output secondary current.

8. A welding transformer as set forth in claim 7 including a second inductance winding connected in series circuit with said secondary and said first mentioned inductance winding and positioned in the same manner as said first mentioned inductance winding in surrounding relation to the plane of movement of the opposite shunt core section.

9. A welding transformer as set forth in claim 5 including an auxiliary core leg portion connected between said pair of core leg sections in a plane substantially parallel to the plane of movement of said shunt core sections, and an auxiliary secondary winding disposed on said auxiliary core leg portion and connected in series circuit with said secondary winding.

10. A welding transformer as set forth in claim 9 in which said secondary winding includes winding sections positioned on said core on opposite sides of said auxiliary secondary winding and connected in series circuit therewith.

11. A welding transformer as set forth in claim 5 in which said primary and secondary windings are disposed in planes parallel to the plane of movement of said shunt core sections.

12. A welding transformer as set forth in claim 5 including a winding disposed about the perimeter of said core and connected in series circuit with said secondary winding and positioned in mutual inductive relation with said primary and secondary windings.

13. A welding transformer comprising inductively coupled primary and secondary windings producing an output current, a ferromagnetic core composing the magnetic circuit for said windings, core extensions on opposite ends of said core outwardly of said windings, each of said core extensions having an air gap therein providing a pair of oppositely disposed air gaps, a shunt transversely movable in one of said air gaps to a preset position to set the maximum output current from said secondary winding, and another shunt independently transversely movable in the other of said air gaps to selectively vary the output current from the set maximum to a minimum.

References Cited in the file of this patent

UNITED STATES PATENTS

| | | |
|---|---|---|
| 2,342,781 | Aamodt | Feb. 29, 1944 |
| 2,425,622 | Kronmiller | Aug. 12, 1947 |
| 2,582,351 | Olson | Jan. 15, 1952 |
| 2,786,941 | Bierl | Mar. 26, 1957 |

FOREIGN PATENTS

| | | |
|---|---|---|
| 49,719 | France | Mar. 21, 1939 |

(First addition to Pat. No. 818,237)